United States Patent
Badat et al.

(10) Patent No.: US 11,626,034 B2
(45) Date of Patent: Apr. 11, 2023

(54) THORAX AND MANIKIN FOR CARDIOPULMONARY RESUSCITATION WITH DELIVERY OF GASEOUS $CO_2$

(71) Applicant: Air Liquide Medical Systems, Antony (FR)

(72) Inventors: Bilal Badat, Montrouge (FR); Jean-Christophe Richard, Sevrier (FR); Manon Hannoucene, Malakoff (FR)

(73) Assignee: Air Liquide Medical Systems, Antony (FR)

( * ) Notice: Subject to any disclaimer, the term of this patent is extended or adjusted under 35 U.S.C. 154(b) by 337 days.

(21) Appl. No.: 16/845,168

(22) Filed: Apr. 10, 2020

(65) Prior Publication Data

US 2020/0327825 A1 Oct. 15, 2020

(30) Foreign Application Priority Data

Apr. 12, 2019 (FR) ..................... 1903946

(51) Int. Cl.
*G09B 23/28* (2006.01)
*A61H 31/00* (2006.01)

(52) U.S. Cl.
CPC ......... *G09B 23/288* (2013.01); *A61H 31/007* (2013.01)

(58) Field of Classification Search
CPC ...... G09B 23/28; G09B 23/288; G09B 23/30; G09B 23/303; A61H 31/00; A61H 31/07
See application file for complete search history.

(56) References Cited

U.S. PATENT DOCUMENTS

| 5,312,259 A | 5/1994 | Flynn | |
| 2008/0131855 A1* | 6/2008 | Eggert | G09B 23/281 434/266 |
| 2009/0017431 A1* | 1/2009 | Adams | G09B 23/288 434/265 |
| 2010/0021876 A1* | 1/2010 | Clash | G09B 23/288 434/265 |
| 2017/0011655 A1* | 1/2017 | Sakezles | G09B 23/285 |

FOREIGN PATENT DOCUMENTS

| EP | 0 560 440 | 9/1993 |
| WO | WO 2010 131143 | 11/2010 |
| WO | WO 2012 155283 | 11/2012 |
| WO | WO 2016 030393 | 3/2016 |
| WO | WO 2018 127262 | 7/2018 |

\* cited by examiner

*Primary Examiner* — Timothy A Musselman
(74) *Attorney, Agent, or Firm* — Allen E. White

(57) ABSTRACT

An artificial thorax (1) with at least one deformable air reservoir (2) having an internal volume (3) containing air and a first orifice (4) in fluidic communication with the internal volume (3), the deformable air reservoir (2) deforming, and at least some of the air leaving the internal volume (3) via the first orifice (4), when a user exerts a manual compression action, directly or indirectly, on said deformable air reservoir (2). The artificial thorax (1) has a $CO_2$ source (10) containing gaseous $CO_2$, such as a gas cylinder, connected fluidically (11) to the internal volume (3) of the deformable air reservoir (2) in such a way as to supply said internal volume (3) with gaseous $CO_2$.

9 Claims, 2 Drawing Sheets

THORAX AND MANIKIN FOR CARDIOPULMONARY RESUSCITATION WITH DELIVERY OF GASEOUS $CO_2$

CROSS REFERENCE TO RELATED APPLICATIONS

This application claims the benefit of priority under 35 U.S.C. § 119 (a) and (b) to French Patent Application No. 1903946, filed Apr. 12, 2019, the entire contents of which are incorporated herein by reference.

BACKGROUND

The invention relates to an artificial thorax for a resuscitation manikin that can be used in particular in a cardiopulmonary resuscitation (CPR) training session and/or demonstration with use of successive chest compressions, and to a manikin of human form comprising an artificial thorax.

Each year, many people suffer a cardiac arrest, and many of these people die because they do not receive treatment promptly. To increase their chances of survival, it is recommended that high-quality cardiac massage be performed on them.

According to the international recommendations of the European Resuscitation Council (ERC), high-quality CPR must meet certain criteria, namely:
- chest compressions having a depth of about 5 to 6 cm,
- a chest compression rate of between 100 and 120 compressions per minute (c/min),
- a change of CPR provider about every 2 minutes,
- a ratio of the chest compression duration to the total resuscitation time, called the CPR fraction, which must be greater than 60% in order to increase the chances of recovery of spontaneous cardiac activity (RSCA), and
- if appropriate, mechanical ventilation associated with the chest compressions.

However, performing high-quality cardiac massage is no easy matter, and first responders involved in managing cases of cardiac arrest have to undergo specific training so as to learn how to perform effective cardiac massage, that is to say high-quality cardiopulmonary resuscitation (CPR).

If the chest compressions are not performed correctly, the patient's chances of survival decrease, whereas, by contrast, effective chest compressions promote an artificial circulation of the blood, taking the place of a spontaneous circulation, and induce chest movements that give rise to pulmonary ventilation of the patient, hence elimination of $CO_2$ via pulmonary gas exchanges.

At present, during cardiopulmonary resuscitation (CPR) training sessions and/or demonstrations with successive chest compressions, use is generally made of resuscitation manikins which are equipped with an artificial thorax and on which the first responders are able to learn and/or practice performing effective, that is to say high-quality, chest compressions, for example firefighters, emergency medical teams, hospital personnel, such as doctors or nurses, or any other person possibly intervening in cases of cardiac arrest.

The CPR manikins available on the market comprise many functionalities and in particular permit monitoring of the quality of the chest compressions. Such manikins are described in particular in WO-A-2016/030393, WO-A-2018/127262, U.S. Pat. No. 5,312,259 and EP-A-560440.

However, none of these manikins permits simulation and measurement of the gas exchanges during a cardiac arrest, in particular the flushing or washing of $CO_2$ during each chest compression, so as to permit a realistic representation of the gas exchanges that take place in the patient's lungs.

Effective cardiac massage leads in fact to better ventilation of the lungs and thus to increased expulsion of $CO_2$, on account of better gas exchange at the alveoli and better blood circulation, and, conversely, poor massage produces limited and/or inadequate ventilation and/or circulation.

It is therefore essential to be able to take account of such gas exchanges, for example during a training session, so as to evaluate the quality of the CPR.

The problem is therefore to be able to simulate and measure the gas exchanges, in particular the flushing of $CO_2$ during each chest compression, when using a resuscitation manikin, for example during a CPR training session and/or demonstration, so as to improve the training of first responders who are called on to treat patients in cardiac arrest, specifically such that they are able to perform effective cardiac massage that also takes account of the pulmonary gas exchanges of the patient.

In other words, the invention aims to make available an artificial thorax for a resuscitation manikin which provides a model of the thoracic cage and of the pulmonary compartment of a patient in cardiac arrest, in order to simulate the gas dynamics induced during the chest compressions and artificial ventilation performed by a first responder.

SUMMARY

The solution is therefore an artificial thorax for a resuscitation manikin comprising at least one deformable air reservoir comprising an internal volume containing air and comprising a first orifice in fluidic communication with the internal volume, said deformable air reservoir deforming, and at least some of the air leaving the internal volume via the first orifice, when a compression action is exerted, directly or indirectly, on said deformable air reservoir, in particular a manual compression action exerted by a user, characterized in that it additionally comprises a $CO_2$ source containing $CO_2$, connected fluidically to the internal volume of the deformable air reservoir in such a way as to supply said internal volume with gaseous $CO_2$.

Depending on the embodiment considered, the artificial thorax of the invention may comprise one or more of the following features:
- it moreover comprises at least one actuator which can be actuated manually by a user, said at least one actuator interacting with said at least one deformable air reservoir in such a way that, when the user exerts a manual compression action on said at least one movable actuator, said at least one movable actuator acts, directly or indirectly, on said deformable air reservoir in order to deform the latter, which allows at least some of the gas contained in it to be expelled via the first orifice.
- it moreover comprises at least one elastic return device interacting with said at least one actuator and/or with said deformable air reservoir.
- it moreover comprises at least one elastic compression device interacting with said at least one actuator and/or with said deformable air reservoir.
- said at least one elastic compression device comprises a first spring.
- said at least one elastic return device comprises a second spring.
- the $CO_2$ source contains $CO_2$ at a content greater than 5% by volume, preferably at least 50% by volume, preferably exclusively $CO_2$ (100% by volume).
- the $CO_2$ source contains $CO_2$ in gaseous form.

the $CO_2$ source is a pressurized gas container.

the $CO_2$ source is a gas cylinder or a rechargeable or disposable cartridge.

the $CO_2$ source has a volume less than or equal to 50 l, preferably less than or equal to 20 l, more preferably less than or equal to 10 l.

the $CO_2$ source contains gas at a pressure of less than or equal to 300 bar absolute, preferably less than or equal to 200 bar absolute.

the $CO_2$ source is equipped with a gas supply valve in the form of a regulator or integrated valve regulator (IVR).

the $CO_2$ source is arranged in such a way as to supply the internal volume of the deformable air reservoir with gaseous $CO_2$ so as to obtain an air/$CO_2$ mixture in the internal volume.

the internal volume of the deformable air reservoir is of the order of 2.5 to 3 litres (water equivalent), so as to represent quite faithfully the base pulmonary volume and/or unforced end-expiratory pulmonary volume of a patient, also called the residual functional capacity (RFC).

the deformable air reservoir comprises a peripheral wall in the shape of a bellows, that is to say of an accordion.

the deformable air reservoir comprises a longitudinal axis (A).

the deformable air reservoir is designed to deform along the longitudinal axis (A).

the deformable air reservoir is made of elastomer or similar.

The invention also relates to a manikin for training, demonstration, simulation or similar, comprising an artificial thorax according to the invention.

Depending on the embodiment considered, the manikin of the invention may comprise one or more of the following features:

it comprises an outer envelope of human form, in particular a torso and a head.

the outer envelope is made of flexible polymer of similar.

it comprises a head with a mouth equipped with a gas orifice for fluidic communication with the internal volume of the deformable air reservoir of the artificial thorax.

the orifice situated in the mouth is connected fluidically to the deformable air reservoir of the artificial thorax via a gas conduit or similar.

the orifice situated in the mouth is connected fluidically to the first orifice of the deformable air reservoir.

it comprises means for monitoring the $CO_2$.

the means for monitoring the $CO_2$ comprise means for measuring the $CO_2$ content and signal processing means.

the means for measuring the $CO_2$ content comprise a $CO_2$ sensor or capnometer.

the means for measuring the $CO_2$ content are designed and/or configured to carry out $CO_2$ concentration measurements in the gas arriving from the deformable air reservoir and to deliver one or more $CO_2$ content measurement signals to the signal processing means.

the signal processing means are configured to process the one or more $CO_2$ content measurement signals delivered by the $CO_2$ content measurement means.

the $CO_2$ sensor is arranged in a mainstream configuration, in particular as close as possible to the mouth of the manikin or as close as possible to the deformable air reservoir, that is to say preferably as close as possible to the orifice of the deformable air reservoir, or between the two.

preferably, the $CO_2$ sensor is configured to carry out continuous $CO_2$ concentration measurements in the gas arriving from the deformable air reservoir, in particular air enriched with $CO_2$ by virtue of an addition of $CO_2$ arriving from the $CO_2$ source.

the signal processing means comprise an electronic board.

the electronic board comprises at least one microprocessor, preferably a microcontroller, using one or more algorithms.

the $CO_2$ sensor forms all or part of an independent measuring and monitoring device.

alternatively, the $CO_2$ sensor is connected to the electronic board.

it additionally comprises display means, i.e. viewing means, for example an indicator or a display screen, with which it is possible to display one or more information items, data items, graphical representations, in particular $CO_2$ values or curves, or other items.

the electronic board is connected electrically to the display means, that is to say to the indicator.

the display means are configured to display at least one $CO_2$ concentration or content in digital or analog form, in particular in the form of graphical representations, such as curves, graphs, etc.

the display means are configured to display at least one $CO_2$ concentration (i.e, content) determined and delivered by the signal processing means after processing of one or more $CO_2$ content measurement signals delivered by the means for measuring the $CO_2$ content.

the display means comprise a remote display screen which is connected to the electronic board by an electric cable or similar, for example a computer screen, it comprises $CO_2$ release control means for controlling the addition of $CO_2$ in the deformable air reservoir and thus the formation of the air/$CO_2$ mixture inside said deformable air reservoir.

the $CO_2$ release control means comprise one or more sensors and valve means, typically one or more solenoid valves.

the $CO_2$ release control means comprise at least one sensor configured to evaluate the quality of the chest compressions, in particular parameters representative of the chest compressions, such as the chest compression rate, the amplitude of the chest compressions, return to the initial position upon relaxation during the chest compression cycles, position of the hands on the chest, etc.

the $CO_2$ release control means are operated by operating means, and the operating means preferably comprise at least one electronic board.

the valve means, typically one or more solenoid valves, are arranged between the $CO_2$ source and the deformable air reservoir in order to adjust, set or regulate the quantity of $CO_2$ introduced into the deformable air reservoir.

the valve means are arranged on the pathway of the gas between the $CO_2$ source and the deformable air reservoir, for example on the gas delivery line connecting the $CO_2$ source to the deformable air reservoir, such as a gas conduit.

the operating means are configured to act on the valve means in order to adjust or set the quantity or flow rate of $CO_2$ delivered to the deformable air reservoir in accordance with a $CO_2$ quantity that is (pre)set or selected by a user, for example by means of a mechanical device of the valve type or similar.

alternatively, the operating means are configured to act on the valve means in response to at least one signal delivered by the sensor serving to evaluate the quality of the chest compressions (i.e. rate, amplitude, etc.), in such a way as to deliver automatically a $CO_2$ quantity or flow rate that is a function of said quality of the chest compressions.

the operating means are configured to act on the valve means proportionally or in an all-or-nothing basis.

it additionally comprises electrical supply means, such as one or more batteries or a socket and a cord for connection to the mains.

the electrical supply means are connected electrically to the various components (e.g. electronic boards, sensors, indicator, etc.) that need to be supplied with electricity in order to function.

Moreover, the invention also relates to the use of an artificial thorax according to the invention or of a manikin according to the invention during a cardiopulmonary resuscitation (CPR) training session, demonstration or simulation with use of successive chest compressions applied to said artificial thorax or manikin.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Carbon dioxide ($CO_2$) holds an essential place in cardiopulmonary resuscitation (CPR). Thus, according to the international recommendations of the European Resuscitation Council (ERC), the monitoring of $CO_2$ is recommended during CPR for several reasons:

to ensure the correct positioning of the endotracheal probe during intubation, to assess the efficacy of the chest compressions, to calculate the breathing rate, to detect the recovery of spontaneous cardiac activity (RSCA), and to help the prognosis of the patient.

During CPR performed on a person in cardiopulmonary arrest, with use of cardiac massage, the alveolar $CO_2$, which depends not only on the ratios between ventilation and pulmonary perfusion but also on the quantity of $CO_2$ generated by the cell metabolism, is a very useful parameter for allowing the first responder, for example a doctor, to judge the efficacy of the CPR.

Good ventilation is crucial for eliminating the $CO_2$. Indeed, the more effective the CPR, the greater the cardiac output generated by the chest compressions, and therefore the larger the quantity of $CO_2$ returned to the lungs. In mechanical ventilation apparatuses, the $CO_2$ is monitored by measuring the parameter $EtCO_2$ (End tidal $CO_2$) which is an indirect reflection of the alveolar $CO_2$.

The venous return is also a very important element during CPR. It is due to the negative intrathoracic pressure (ITP) resulting from the forces of recoil of the thorax during relaxation. The amplitude of this negative pressure is influenced principally by the return of the pulmonary volume to the residual functional capacity (RFC), The RFC corresponds to the residual volume of air in the lungs after a spontaneous and unforced exhalation. In reality, in the very specific case of cardiac arrest, the RFC is quite simply the volume of air present in the lungs when the patient collapses. The pulmonary volume thus appears to be an essential element in the case of CPR.

A manikin equipped with an artificial thorax permits as precise as possible a reflection of the important physiological phenomena to be taken into account during CPR, and taking place in the thorax and the respiratory system, and thus makes it possible to realistically simulate a patient in cardiac arrest, especially during a cardiopulmonary resuscitation (CPR) training session and/or demonstration with use of chest compressions.

In the context of the present invention, a manikin equipped with an artificial thorax is proposed which is improved in relation to existing ones since it makes it possible to take account of the pulmonary gas exchanges, in particular to simulate a quantity of $CO_2$ expelled by the lungs of the manikin on account of the chest compressions, and thereby to assist the first responders carrying out the cardiac massage by teaching them to take account of this $CO_2$, in particular to determine a recovery of spontaneous cardiac activity (RSCA).

Figure 1:
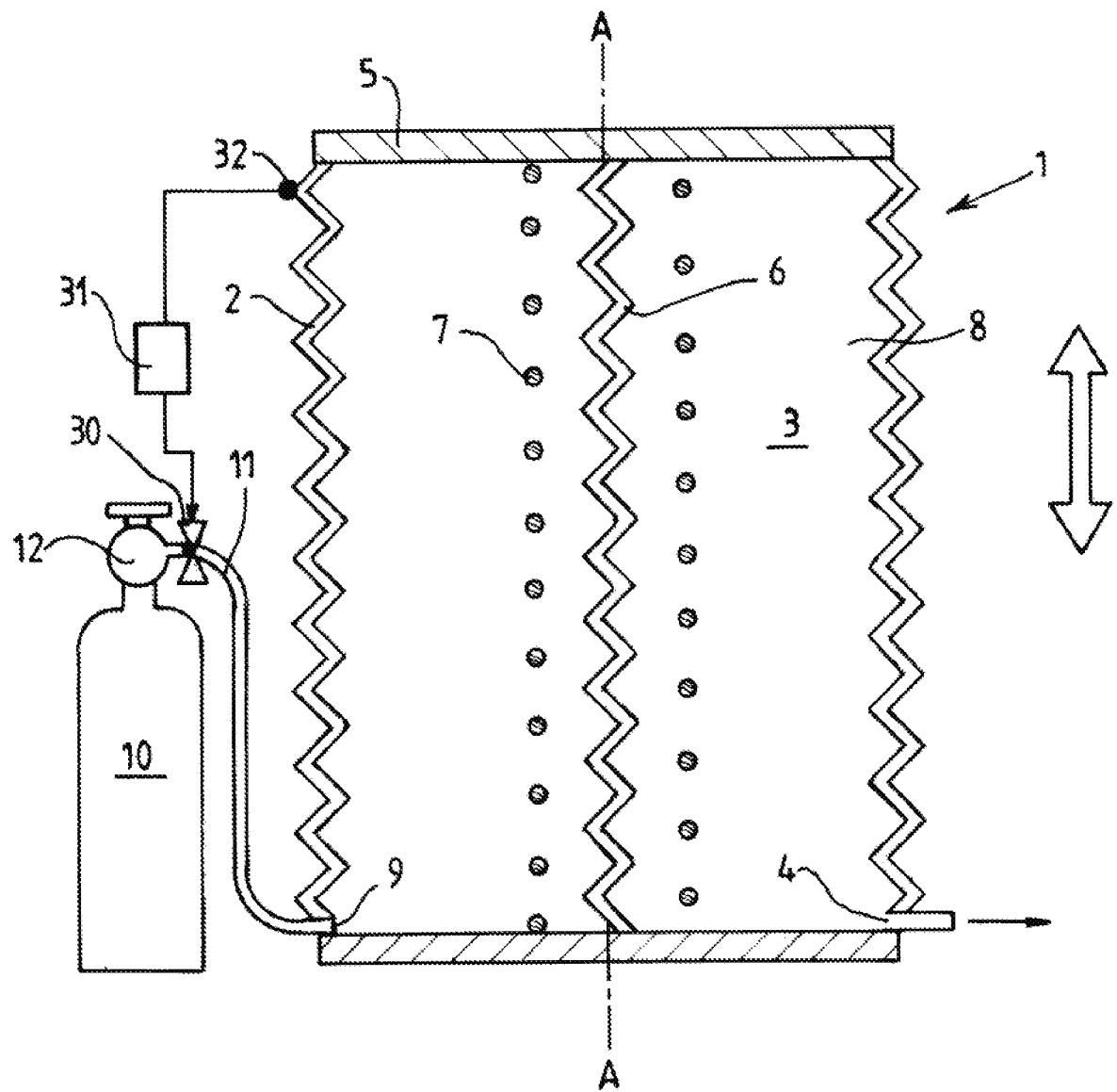
FIG. 1 is a schematic representation of an artificial thorax according to the invention.

FIG. 1 shows a schematic representation of an artificial thorax 1 for a resuscitation manikin according to the invention, making it possible to simulate and preferably measure the gas exchanges, in particular the flushing of $CO_2$ upon each chest compression, for example during a CPR training session and/or demonstration with use of chest compressions, that is to say a cardiopulmonary massage.

The artificial thorax 1 comprises a deformable air reservoir 2, for example made of elastomer material or similar, having a longitudinal axis (AA) and defining an internal volume 3 containing air. This deformable air reservoir 2 can have a bellows shape, that is to say a peripheral wall 78 with an "accordion" shape or similar. The internal volume 3 of the deformable air reservoir 2 represents the pulmonary volume of a patient, also called the residual functional capacity (RFC), and is of the order of 2.5 to 3 litres (about 30 ml/kg).

Moreover, the deformable air reservoir 2 comprises a first orifice 4 in fluidic communication with the internal volume 3 and is designed to deform and to expel at least some of the gas contained in it through the first orifice 4 when a user, for example a first responder learning to perform cardiac massage, exerts a manual compression action, directly or indirectly, on the deformable air reservoir 2, typically an axial compression along the axis (AA), that is to say from the top downward in FIG. 1.

Preferably, it moreover comprises a movable actuator 5 which can be actuated manually by the user and which interacts with the deformable air reservoir 2 in such a way that, when the user exerts a manual compression action on this movable actuator 5, the latter acts directly or indirectly on the deformable air reservoir 2 in order to deform the latter and expel gas from it via the first orifice 4.

The actuator 5 can be, for example, a rigid plate or similar. This actuator 5 in fact simulates the thoracic cage of the patient.

In order to permit the downward and upward movements of the actuator 5 and the axial compressions and relaxations (AA) of the deformable air reservoir 2, one or more elastic compression devices 6 and one or more elastic return devices 7 are also provided which interact with the actuator 5 and/or with the deformable air reservoir 2, of which the resistance and repulsion forces are chosen to reproduce the mechanical properties of the respiratory system of an individual in cardiac arrest.

Preferably, the elastic compression device 6 comprises one or more first springs, called compression springs, and the elastic return device 7 comprises one or more second springs, called extension springs. Advantageously, they are arranged inside the internal volume 3 of the deformable air reservoir 2, as can be seen in FIG. 1, that is to say inside the bellows. Such an internal thorax architecture is conventional and known from WO-A-2016/030393, to which reference may be made for further details.

Thus, the one or more compression springs make it possible to create a resistance during massage, that is to say upon each chest compression that the first responder applies to the actuator 5, i.e. along the axis (AA) in the downward direction, while the one or more extension springs create a resistance to the air insufflation, that is to say in the relaxation period (i.e. the period free of chest compression) during which mechanical ventilation may be implemented, for example with the aid of an assisted ventilation apparatus, also called a medical ventilator, or a manual ventilation balloon, also called a bag valve mask, making it possible to insufflate air to the patient.

Figure 2:
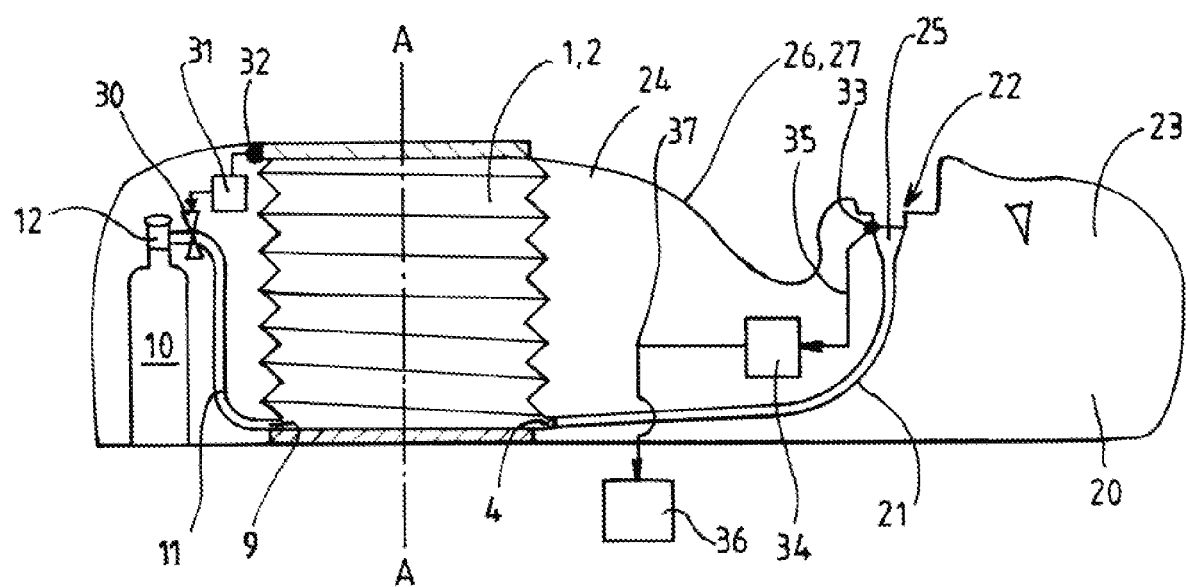
FIG. 2 is a schematic representation of a manikin comprising an artificial thorax according to the invention.

According to the invention, in order to be able to simulate and possibly measure the gas exchanges, in particular the flushing of $CO_2$ upon each chest compression, during the use of such an artificial thorax, in particular when it is integrated in a resuscitation manikin as illustrated in FIG. 2, for example during a CPR training session and/or demonstration, with a view to improving the training of first responders by allowing them to perform effective cardiac massage also taking account of the pulmonary gas exchanges of the patient, a $CO_2$ source 10 containing gaseous $CO_2$ is provided, which is connected fluidically to the internal volume 3 of the deformable air reservoir 2 in such a way as to supply this internal volume 3 with gaseous $CO_2$ and to obtain an air/$CO_2$ mixture which can then be monitored.

More precisely, the artificial thorax 1 for a resuscitation manikin 20 according to the invention, supplied via such a $CO_2$ source 10, permits modelling of the thoracic cage and of the pulmonary compartment of a patient in cardiac arrest in order to simulate the gas dynamics induced during the chest compression movements performed by the first responder, in particular the expulsion of $CO_2$.

Indeed, the $CO_2$ delivered directly to the patient's lungs by the chest compressions during the cardiac massage makes it possible to obtain a representation of the $CO_2$ production over the course of the CPR, and it is therefore imperative to be able to simulate it during training or the like on a training manikin 20.

According to the invention, by having a realistic pulmonary volume, i.e. 2.5 to 3 l of internal volume 3, associated with a suitable variable supply of $CO_2$ from the $CO_2$ source 10 in the respiratory system of the artificial thorax 1 of the manikin 20, it is possible to reproduce faithfully the gas exchanges that occur during a cardiac arrest, that is to say the insufflation of air containing oxygen ($O_2$) during ventilation with insufflation of air, and the exhalation of gas rich in $CO_2$, upon each chest compression caused by the cardiac massage.

The $CO_2$ source 10 is advantageously a small cylinder of pressurized gas, that is to say a cylinder having an internal volume of 10 l or less (water equivalent), for example 2 l to 5 l, and containing pure $CO_2$ (100%) or a mixture of $CO_2$ with a carrier gas, for example an inert gas, such as nitrogen, at a pressure of less than or equal to 200 bar abs.

As is illustrated in FIG. 1, the $CO_2$ cylinder 10, for example made of aluminium alloy, is connected fluidically to the internal volume 3 of the deformable reservoir 2 by a flexible hose 11 which communicates with the internal volume 3 via a second orifice 9 permitting introduction of $CO_2$ into the internal volume 3.

The $CO_2$ cylinder 10 is equipped with a gas supply valve, for example a valve with a built-in gas regulator or similar, making it possible to reduce the gas pressure to a use pressure of the order of a few bar abs., for example of the order of 1 to 4 bar abs.

Moreover, $CO_2$ release control means are provided for controlling the addition of $CO_2$ in the deformable air reservoir 2 and thus the formation of the air/$CO_2$ mixture in the internal volume 3 of the deformable air reservoir 2.

The $CO_2$ release control means comprise valve means 30, for example a controlled solenoid valve, or a manually regulated mechanical device.

The valve means 30 are arranged between the $CO_2$ source 10 and the deformable air reservoir 2, typically on the pathway of the gas between the $CO_2$ source 10 and the deformable air reservoir 2, for example on the gas supply line 11, such as a gas conduit, connecting the $CO_2$ source 10 to the deformable air reservoir 2, as is indicated schematically in FIG. 1.

Advantageously, one or more sensors 32 are also provided, which are configured to evaluate the quality of the chest compressions, that is to say parameters representative of the chest compressions, such as the chest compression rate, the amplitude of the chest compressions, return to the initial position upon relaxation during the chest compression cycles, position of the hands on the chest, etc.

Preferably, the valve means 30 are operated by operating means 31, preferably an electronic board comprising or more microprocessors, preferably a microcontroller, in such a way as to adjust, set or regulate the quantity of $CO_2$ introduced into the deformable air reservoir 2.

According to one embodiment, the operating means 31 are configured to act on the valve means 30 in response to at least one signal delivered by the one or more sensors 32 serving to evaluate the quality of the chest compressions (i.e. rate, amplitude, etc.), in such a way as to deliver automatically a $CO_2$ quantity or flow rate that is a function of said quality of the chest compressions.

According to another embodiment, the operating means 30 can also be configured to act on the valve means 31 in order to adjust or set the quantity or flow rate of $CO_2$ delivered to the deformable air reservoir 2 in accordance with a $CO_2$ quantity that is (pre)set or selected by a user.

Generally, the operating means 31 are configured to act on the valve means 30 proportionally or in an all-or-nothing basis.

Moreover, it comprises $CO_2$ monitoring means including means 33 for measuring the $CO_2$ content, such as a $CO_2$ sensor or capnometer, and signal processing means 34.

The means 33 for measuring the $CO_2$ content, that is to say the capnometer, are designed or configured to carry out $CO_2$ concentration measurements in the gas arriving from the deformable air reservoir 2, that is to say the air/$CO_2$ mixture, and to deliver $CO_2$ content measurement signals to the signal processing means 34.

In the embodiment in FIG. 2, the $CO_2$ sensor 33 is arranged in a "mainstream" configuration as close as possible to the mouth 25 of the manikin 20. However, it could also be arranged as close as possible to the outlet orifice 4 of the deformable air reservoir 2, or else between this outlet orifice 4 and the mouth 25 of the manikin 20.

The $CO_2$ sensor 33 is connected (via 35) to the signal processing means 34, typically an electronic board with microprocessor, preferably a microcontroller, using one or more algorithms, in such a way as to transmit thereto the $CO_2$ content measurement signals coming from said sensor 33.

For their part, the signal processing means 34 are configured to process the $CO_2$ content measurement signals that are delivered. They interact with display or viewing means 36, for example a screen of a computer or similar, in such a way as to transmit thereto and display there one or more information items, values, data, graphical representations, especially $CO_2$ values or curves, or similar. In particular, the display means 36 are configured to display at least a $CO_2$ concentration or content in numerical or analog form, in particular in the form of graphical representations, such as curves, graphs, etc.

The link 37 between the signal processing means 34 and the display means 36, permitting in particular the transmission of data or similar, can be a wired or wireless link, for example Wifi or Bluetooth.

It will be noted that the electronic boards 31, 34 can be in the form of one or several electronic boards.

FIG. 2 shows a schematic representation of a manikin 20 comprising an artificial thorax 1 according to the invention and the other elements mentioned above.

In this embodiment, the manikin 20 comprises an outer envelope having the general form of a human body, here with a torso 24 and a head 23. The envelope 26 can be rigid or semi-rigid, for example made of polymer, and can be covered with a flexible artificial fabric 27 representing the skin. Preferably, the head comprises a face with a nose and eyes and with a mouth 25 provided with a gas orifice 22 and connected fluidically to the internal volume 3 of the deformable reservoir 2 via a gas passage 21, such as a tube, a gas conduit or similar, and the first orifice 4 of the reservoir 2.

The gas passage 21 permits the gas exchanges from the reservoir 2 to the mouth 25 and the gas outlet orifice 22, during the chest compressions, and the delivery of the gas, in the opposite direction, that is to say towards the deformable reservoir 2, during the insufflation of gas in the periods without chest compression, when the manikin 20 is connected fluidically to an artificial ventilation device, such as a medical ventilator or a bag mask valve, that is to say a self-filling balloon with one-way valve (not shown).

The manikin 20 with artificial thorax 1 according to the invention can be used for CPR training, for CPR demonstrations, for practice or for any other purposes, in particular for testing a CPR-specific device with a view to simulating the airways of a person. According to other embodiments, it can also comprise arms and/or legs.

By virtue of a controlled delivery of $CO_2$ and of an internal volume 3 representing the residual functional capacity (RFC) of a patient, a manikin 20 of this kind constitutes a physiological model representative of a patient in cardiorespiratory arrest (CRA).

According to the invention, the addition of $CO_2$ to the air contained in the internal volume 3 of the reservoir 2 makes it possible to simulate good cardiac massage and poor cardiac massage, hence to reflect and simulate the mechanisms inherent to the physiology of cardiac arrest. Indeed, in vivo monitoring of the $CO_2$ expelled during chest compressions is a very good indicator of the quality of the chest compressions and of the patient's circulation.

The addition of $CO_2$ is effected by virtue of the gaseous $CO_2$ arriving from a $CO_2$ source 10, such as a small cylinder or $CO_2$ cartridge, as explained above, which can either be integrated in the envelope of the manikin 20, as illustrated in FIG. 2, or placed outside the manikin 20.

Such an artificial thorax 1 and/or manikin 20 according to the invention can be used during a cardiopulmonary resuscitation (CPR) training session, demonstration or simulation with use of successive chest compressions applied to said artificial thorax 1 or manikin 20.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An artificial thorax comprising at least one deformable air reservoir comprising an internal volume containing air and comprising a first orifice in fluidic communication with the internal volume, said deformable air reservoir capable of deforming, and having at least some of the air leaving the internal volume via the first orifice, when a compression action is exerted, directly or indirectly, on said deformable air reservoir, wherein the artificial thorax additionally comprises a $CO_2$ source containing $CO_2$, connected fluidically to the internal volume of the deformable air reservoir in such a way as to be adapted to supply said internal volume with gaseous $CO_2$.

2. The artificial thorax according to claim 1, further comprising at least one actuator which can be actuated manually by a user and which interacts with said at least one deformable air reservoir in such a way that, when the user exerts a manual compression action on said at least one movable actuator, said at least one movable actuator acts, directly or indirectly, on said deformable air reservoir in order to deform the latter.

3. The artificial thorax according to claim 2, further comprising at least one elastic compression device and/or at least one elastic return device interacting with said at least one actuator and/or with said deformable air reservoir.

4. The artificial thorax according to claim 3, wherein the at least one elastic compression device and/or the at least one elastic return device are arranged inside the internal volume of the deformable air reservoir.

5. The artificial thorax according to claim 1, wherein the $CO_2$ source contains $CO_2$ at a content greater than 5% by volume.

6. The artificial thorax according to claim 1, wherein the $CO_2$ source is a pressurized gas container, in particular a gas cylinder.

7. The artificial thorax according to claim 1, wherein the $CO_2$ source is arranged in such a way as to supply the internal volume of the deformable air reservoir with gaseous $CO_2$ so as to obtain an air/$CO_2$ mixture in said internal volume.

8. A manikin for training, demonstration or simulation, comprising an artificial thorax according to claim 1, said manikin having a human form with a torso and a head.

9. The manikin according to claim 1, further comprising a mouth with a gas orifice connected fluidically to the first orifice of the deformable air reservoir.

* * * * *